United States Patent
Bishop et al.

(10) Patent No.: US 6,805,287 B2
(45) Date of Patent: Oct. 19, 2004

(54) SYSTEM AND METHOD FOR CONVERTING A STORED VALUE CARD TO A CREDIT CARD

(75) Inventors: Fred Bishop, Glendale, AZ (US); Trey Neemann, Glendale, AZ (US); David Armes, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 10/242,584

(22) Filed: Sep. 12, 2002

(65) Prior Publication Data

US 2004/0050928 A1 Mar. 18, 2004

(51) Int. Cl.[7] .............................................. G06F 17/00
(52) U.S. Cl. ...................... 235/379; 235/380; 235/381; 235/382; 235/382.5; 705/35; 705/68; 705/70; 705/75
(58) Field of Search .................................. 235/375, 379, 235/380, 383; 705/41, 44, 35, 68, 70, 75

(56) References Cited

U.S. PATENT DOCUMENTS

| | | |
|---|---|---|
| 5,276,311 A | 1/1994 | Hennige |
| 5,326,960 A | 7/1994 | Tannenbaum |
| 5,477,038 A | 12/1995 | Levine et al. |
| 5,577,109 A | 11/1996 | Stimson et al. |
| 5,585,787 A | 12/1996 | Wallerstein |
| 5,590,038 A | 12/1996 | Pitroda |
| 5,649,118 A | 7/1997 | Carlisle et al. |
| 5,864,830 A | 1/1999 | Armetta et al. |
| 5,883,810 A * | 3/1999 | Franklin et al. ............ 700/232 |
| 5,917,168 A | 6/1999 | Nakamura et al. |
| 5,936,221 A | 8/1999 | Corder et al. |
| 5,953,710 A * | 9/1999 | Fleming ....................... 705/38 |
| 5,970,478 A * | 10/1999 | Walker et al. ................ 705/35 |
| 5,991,413 A | 11/1999 | Arditti et al. |
| 5,991,748 A | 11/1999 | Taskett |
| 6,000,832 A | 12/1999 | Franklin et al. |
| 6,021,943 A * | 2/2000 | Chastain .................... 235/379 |
| 6,032,136 A | 2/2000 | Brake, Jr. et al. |
| 6,045,050 A | 4/2000 | Ippolito et al. |
| 6,068,184 A * | 5/2000 | Barnett ...................... 235/379 |
| 6,076,076 A | 6/2000 | Gottfreid |
| RE36,788 E | 7/2000 | Mansvelt et al. |
| 6,095,411 A | 8/2000 | Schrenk |
| 6,105,008 A | 8/2000 | Davis et al. |
| 6,163,771 A | 12/2000 | Walker et al. |
| 6,182,895 B1 | 2/2001 | Albrecht |
| 6,189,787 B1 | 2/2001 | Dorf |
| 6,267,292 B1 | 7/2001 | Walker et al. |
| 6,298,336 B1 | 10/2001 | Davis et al. |
| 6,315,195 B1 | 11/2001 | Ramachandran |
| 6,341,724 B2 | 1/2002 | Campisano |
| 6,375,073 B1 | 4/2002 | Aebi et al. |
| 6,402,029 B1 | 6/2002 | Gangi |
| 6,578,761 B1 * | 6/2003 | Spector ...................... 235/380 |
| 6,615,189 B1 * | 9/2003 | Phillips et al. ................ 705/41 |

* cited by examiner

Primary Examiner—Michael G. Lee
Assistant Examiner—Ahshik Kim
(74) Attorney, Agent, or Firm—Snell & Wilmer L.L.P.

(57) ABSTRACT

A method and system for converting a first transaction account device to a second transaction account device wherein a card number associated with, or defined as, a first transaction account (e.g., stored value account) is re-associated with, or re-defined as, a second transaction account (e.g., credit card account).

18 Claims, 4 Drawing Sheets

SYSTEM AND METHOD FOR CONVERTING A STORED VALUE CARD TO A CREDIT CARD

FIELD OF INVENTION

The present invention relates, generally, to a system and method for transferring the association of a transaction card number from a first type of account to a second type of account. In particular, this invention allows a customer to transmit an existing card number, such as that embossed on a stored value card, to a host system, and request that the account number be re-associated and/or redefined from a first transaction account (e.g., stored value account) to a second transaction account (e.g., credit card account).

BACKGROUND OF THE INVENTION

Stored value cards and credit cards are forms of transaction instruments which provide cash equivalent value that can be used within an existing payment/transaction infrastructure. A difference between the accounts associated with the two types of cards is when the monetary value becomes available for use. Stored value cards are frequently referred to as prepaid or cash cards, in that money is deposited in the account associated with the card before use of the card is allowed. If a customer deposits ten dollars of value into the account associated with the card, the card can be used for payments up to ten dollars. In contrast, credit cards are backed not by cash, but by a line-of-credit that has been issued to the customer by a financial institution. As such, upon use of the credit (or charge) cards, the cash payment from the customer is completed after the purchase from the merchant, namely, when the customer is billed for using the line-of-credit associated with the card.

Another difference between the stored value card and the credit/charge card is the revenue generated from the use of the cards. With stored value cards, the monetary value is prepaid and the customer is assessed a fee whenever funds are loaded onto the card, wherein the fee is usually either a flat fee or a small percentage of the amount loaded. In contrast, credit cards represent a line-of-credit issued to the owner, so a finance charge and/or interest is typically assessed on any charged amount that is not paid off at the end of each month (e.g., unpaid balance). The finance charge assessed is usually anywhere from 10–25% of this balance. Therefore, credit cards are often more profitable than stored value cards. However, stored value cards are more easily acquired, so there are more stored value cards issued, funded, and used each day. Moreover, fewer distribution restrictions are placed upon stored value cards. For example, a stored value card with a five dollar monetary value may be distributed to customers by a number of different methods (e.g., shipping with product, promotional distribution, etc). In contrast, credit or charge cards generally may only be shipped to the customer at the customer's request. Thus, one of the problems faced within the transaction card industry is how to most effectively distribute credit or charge cards to potential customers while still abiding by the distribution restrictions.

Another problem with credit or charge cards is that it can take several days or even weeks between the time a credit card application is completed and approved to when the customer receives the transaction card. In contrast, customers can purchase stored value cards at many outlets without waiting. Thus, a system or method is needed that enables a credit card applicant to more expeditiously obtain a transaction instrument corresponding to the customer's credit card account.

SUMMARY OF THE INVENTION

The present invention generally relates to a system and method for converting a first transaction account device (e.g., a card associated with a stored value account) to a second transaction account device (e.g., a card associated with a credit card account) by either re-associating or redefining a card number from a first transaction account (e.g., stored value account) to a second transaction account (e.g., credit account).

An exemplary method of this invention comprises the steps of: establishing a second transaction account, receiving a card number associated with a first transaction account, and then, re-associating said card number to said second transaction account. Another exemplary method of this invention comprises the steps of: establishing a second transaction account, receiving a card number corresponding to a first transaction account, and redefining the first transaction account as said second transaction account, wherein said first transaction account is then closed.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps in the similar views, and.

Figure 1:
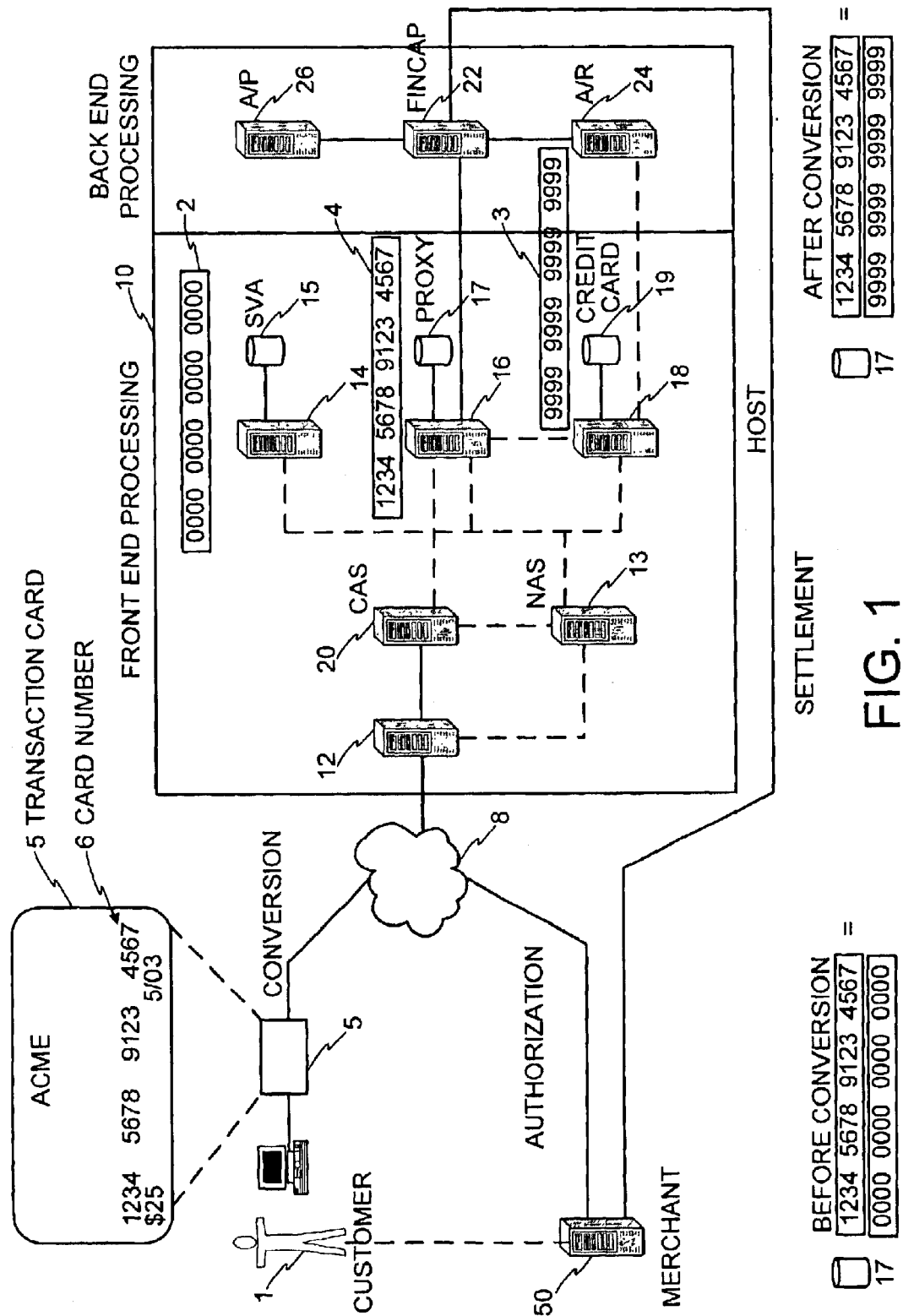
FIG. 1 illustrates an overview of system components comprising an exemplary embodiment of the present invention.

Other aspects and features of the present invention will be more fully apparent from the detailed description that follows.

DETAILED DESCRIPTION OF EXEMPLARY EMBODIMENTS

The following descriptions are of exemplary embodiments of the invention, and are not intended to limit the scope, applicability or configuration of the invention in any way. Rather, the following descriptions are intended to provide convenient illustrations for implementing various embodiments of the invention. As will become apparent, various changes may be made in the function and arrangement of the elements described in these embodiments without departing from the spirit and scope of the invention.

The present invention overcomes the problems of the prior art by allowing a single card number originally used as a first transaction account device (e.g., stored value card) to be changed to a second transaction account device (e.g., credit card). In an exemplary embodiment, the number on the card ("card number"), which is associated with a first transaction account in a host system, is re-associated to a second transaction account in a host system. In another embodiment, the card number, originally corresponding to, or defined as, a first transaction account is redefined within a host database system as a second transaction account. The card number may be, for example, the same as a stored value account or a credit card account. Or, the card number may be the same as a proxy account number, wherein the proxy account is used as a proxy for one or more accounts. Co-pending U.S. patent application Ser. No. 09/800,461, System For Facilitating a Transaction, by Breck et al., and filed on Mar. 7, 2001, describes various transaction processing systems, including the use of secondary transaction numbers (i.e., proxy accounts), the entire contents of which is hereby incorporated by reference.

In an exemplary embodiment, the system of the present invention allows customers to obtain a credit card device in a substantially real time environment by associating an existing card number to a new or existing credit card account. In particular, the card number embossed on the customer's first transaction account device (e.g., stored value card), may be re-associated within the host system from a first transaction account (e.g., stored value account) to a second transaction account (e.g., a credit or charge card account), wherein the second transaction account is associated with a line of credit established by the customer.

As used herein, a "transaction" includes any exchange or delivery of value, exchange or delivery of data, gifting of value or data, etc. The term "transaction" not only contemplates an exchange of goods or services for value from one party to another, but also the gifting of anything from one party to another. Additionally, transaction account numbers include account numbers that are used to facilitate any type of transaction. As used herein, "card number" includes any device, code, number, letter, symbol, biometric or other identifier/indicia suitably configured to allow the customer to interact or communicate with the system, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, transponder, radio frequency card and/or the like. Although the term "card number" is used throughout, the number need not physically exist on a "card" per se. In other words the card number may be a number communicated to the customer, merchant or host by any means. The card number may be distributed and stored in any form of plastic, electronic, magnetic, radio frequency, wireless, audio and/or optical device capable of transmitting or downloading data from itself to a second device.

As shown in FIG. 1, an exemplary embodiment of the present invention includes a host system 10 comprising various systems or sub-systems for processing financial account data. These systems are generally known in the art as systems for processing merchant 50 authorization requests and for facilitating transaction settlements.

The host system 10 includes any hardware and/or software suitably configured for processing merchant authorization requests and for facilitating transaction settlements. In an exemplary embodiment of this invention shown in FIG. 1, host system 10 comprises one or more interface systems 12 configured to facilitate communication with one or more customers 1 and/or one or more merchants 50. The interface system 12 is generally configured to route and communicate customer 1 and/or merchant 50 data to a card authorization system (CAS) 20 and/or a new accounts system (NAS) 13. The host system 10 also comprises server systems and databases for transaction accounts. These server systems may include: a first transaction account system, e.g., stored value account server 14 and database 15; a second transaction account system, e.g., credit card account server 18 and database 19; and, if desired, a proxy account system, including, e.g., STN server 16 and database 17. The previously mentioned components may be referred to as "front end processing components" which facilitate transaction authorizations to complete transactions. As those skilled in the art will appreciate, any hardware, software and/or systems discussed herein may be included within one host or distributed among many locations or entities.

Backend components of the host system 10 include any hardware and/or software generally configured to facilitate transaction settlement, i.e., payment of merchant 50 and invoicing of customer 1. These components generally include, for example, a financial capture system (FINCAP) 22 for capturing the merchant's 50 receipt and summary of charges, an accounts receivable system 24 for adjusting the account and billing customer, and an accounts payable system 26 for paying the merchant 50. These backend components may be configured to communicate with one or more front end components, e.g. NAS 13, CAS 20, etc. In an exemplary financial infrastructure, the accounts receivable system 24 may replace or perform the same function as the credit card system 18.

As shown in FIG. 1, in an exemplary stored value card system employing a proxy account number, a card number 6 (1234567891234567) embossed on a stored value card 5 is associated with a stored value account (0000000000000000) in a proxy system comprising a STN server 16 and database 17. When the customer's card 5 is used for a purchase, the stored value account is accessed and debited. After conversion, the card number 6 (1234567891234567) is then associated within the proxy system with the credit account (9999999999999999), such that when the customer's card 5 is used, the credit account is charged and the customer is later invoiced for the charges.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

The components of the present invention are described herein in terms of functional block components, flow charts and various processing steps. As such, it should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography, please review a text written by Bruce Schneirer which is entitled *Applied Cryptography: Protocols, Algorithms, and Source Code In C*, published by John Wiley & Sons (second edition, 1996), which is hereby incorporated by reference.

One skilled in the art will appreciate that a network 8 in FIG. 1, for example, may include any system for exchanging data or transacting business, such as the Internet, an intranet, an extranet, WAN, LAN, satellite or wireless communications, and/or the like.

Customer 1 may interact with the host system 10 or a merchant 50 via any input device such as a telephone, keyboard, mouse, kiosk, personal digital assistant, touch screen, voice recognition device, transponder, biometrics device, handheld computer (e.g., Palm Pilot®), cellular phone, web TV, web phone, blue tooth/beaming device and/or the like. Similarly, the invention could be used in conjunction with any type of personal computer, network computer, workstation, minicomputer, mainframe, or the like running any operating system. Moreover, although the invention uses protocols such as TCP/IP to facilitate network communications, it will be readily understood that the invention could also be implemented using IPX, Appletalk, IP-6, NetBIOS, OSI or any number of existing or future protocols. Moreover, the system contemplates the use, sale, exchange, transfer, or any other distribution of any goods, services or information over any network having similar functionality described herein. Communication between the parties (e.g., customer 1, host 10 and/or merchant 50) to the transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The merchant 50 computer and the host 10 computer may be interconnected via a second network, referred to as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, flash card memory and/or the like.

While an exemplary embodiment of this invention is described in association with a financial transaction system, the invention contemplates any type of networks or transaction systems, including, for example, unsecured networks, public networks, wireless networks, closed networks, open networks, intranets, extranets, and/or the like.

As used in the present invention, the term "customer" includes any individual, business, entity, merchant, hardware and/or software who possesses a card number 6 associated with a first transaction account, and desiring to use that card number 6 in association with a second transaction account. In an exemplary embodiment, the customer 1 establishes a new or has an existing relationship or association with a host 10. For example, in one embodiment, a customer 1 may be an American Express® card member. In another embodiment, a customer 1 may be a participant in a frequent flyer rewards program. In a further embodiment, the customer 1 is a member of any suitable organization that provides transaction products or services. Another embodiment contemplates the customer 1 providing the card number 6 to a second party, such that the card number 6 is utilized as a limited use account number.

"Merchant" includes any individual, business, entity, customer, hardware and/or software that receives a card number 6 to facilitate a transaction, whether or not in exchange for goods or services. For example, in one embodiment, a merchant 50 may be an online bookstore such as Amazon.com®. In another embodiment, a merchant 50 may be a local hardware store. Although referred to herein as a "merchant 50," this term contemplates situations where any second party receives a card number 6 and is suitably configured to communicate with the host 10 to process the customer 1 transaction request.

Host 10 includes any person, entity, hardware and/or software that facilitates any type of transaction. As contemplated by an exemplary embodiment of the present invention, the host 10 establishes and maintains account and/or transaction information for the customer 1. The host 10 may issue products to the customer 1 and may also provide both the customer 1 and the merchant 50 with the processes to facilitate the transaction system of the present invention. The host 10 includes, for example, banks, credit unions, credit, debit or other transaction-related companies, telephone companies, or any other type of card or account issuing institutions, such as card-sponsoring companies, incentive rewards companies, or third-party providers under contract with financial institutions. Unless otherwise specifically set forth herein, although referred to as "host," this term should be understood to mean any entity issuing any type of account to facilitate any transaction, exchange or service, and should not be limited to companies possessing or issuing physical cards. In an exemplary system, the host 10 may be any transaction facilitating company such as a charge/credit card provider like American Express®, VISA®, Mastercard®, Discover®, etc.

In an exemplary embodiment, a proxy account number 4 may be used to facilitate the conversion. Proxy number 4 is any number, code, symbol, indicia, etc., that is associated with, or a proxy for, another number or account that has been designated by the customer 1 or the host 10 as a primary account number. As shown in FIG. 1, the proxy number 4 may be the same as the card number 6. In an exemplary embodiment, shown in FIG. 1, the proxy number 4 (1234567891234567) is associated with a stored value account number 2 (0000000000000000) maintained in a stored value account database 15. When the card number 6 (which corresponds to the proxy number 4) is used for a purchase, the associated stored value account number 2 is recognized and the amount of purchase is subtracted from the stored value account balance.

After conversion of the stored value card to a credit card, the proxy number 4 (1234567891234567) is thereafter associated with the designated credit card account number 3 (9999999999999999). Thus, when a purchase is made with the card number 6/proxy number 4 after conversion, the customer's 1 credit account is accessed and the credit account is adjusted accordingly. In another exemplary embodiment, the proxy account system is not utilized. Rather, the card number 6 corresponds directly with the stored value account number 2 instead of the proxy number 4.

In an exemplary embodiment involving credit, debit or other banking cards, the card number 6 has the same industry standard format that is used for the regular banking cards (e.g., 15 or 16 digit numbers). In one embodiment, the numbers are formatted such that one is unable to differentiate between a card number 6 and a regular physical charge card number. Alternatively, however, the host 10 card provider/product identifier (e.g., BIN range, first 6 digits, etc.) numbers may be different so as to differentiate the card numbers used as proxies from regular charge card numbers. In referencing the card number 6 and other transaction account numbers, it should be appreciated that the number may be, for example, a sixteen-digit credit card account number, although each card provider has its own numbering system, such as the fifteen-digit numbering system used by American Express®. Each company's card numbers comply with that company's standardized format such that a company using a sixteen-digit format will generally use four spaced sets of numbers, as represented by the number "0000 0000 0000 0000." The first five to seven digits are reserved for processing purposes and identify the issuing bank, card type, etc. In this example, the last sixteenth digit is used as a sum check for the sixteen-digit number. The intermediary eight-to-ten digits are used to uniquely identify the customer 1. The invention contemplates the use of other numbers, indicia, codes or other security steps in addition to the use of the card number 6.

Before discussing the conversion process of the present invention, an understanding of the system and operation of an exemplary stored value account is discussed. The card number 6 on the stored value card may be associated with a stored value account 2 via a proxy system using a proxy server (STN 16) and database 17 shown in FIG. 1. Alternatively, the card number 6 corresponds directly to the stored value account without using a proxy system. Regardless of the system configuration, whenever card number 6 is used, the stored value account is debited for the amount of the transaction.

Figure 2:
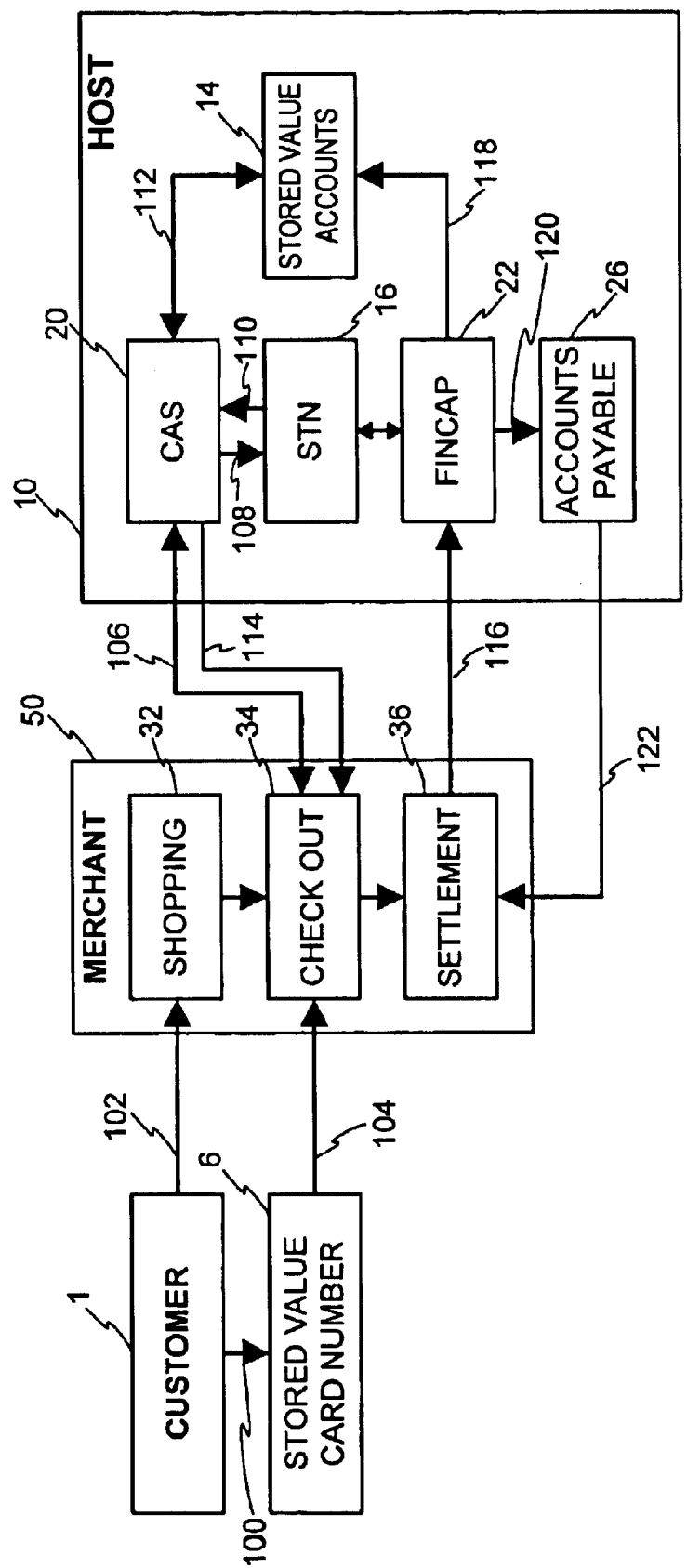
FIG. 2 is a schematic illustrating the process of using a stored value account via a proxy account.

Referencing both FIGS. 1 and 2, to facilitate use of a stored value card via a proxy number 4 using STN 16, a customer 1 acquires a pre-funded stored value card 5 (STEP 100), from, e.g., a retail store. The customer 1 selects merchandise for purchase (STEP 102) from a merchant 50 and presents the card 5 to pay for the purchase (STEP 104). This shopping and purchase may occur online over the internet, in-person at a point of sale terminal (POS) and/or via any other transaction interface. The merchant 50 recognizes the card 5 as being issued by particular host 10 and requests the payment be authorized by the host 10 (STEP 106). The authorization system CAS 20 accepts the request, recognizes that the card number 6 on card 5 corresponds to a proxy number 4 in the STN 16 system and requests the primary account associated with the proxy number 4 (STEP 108). Within STN 16 (and database 17), for example, the proxy number 4 is associated with a corresponding stored value account number 2. STN 16 accesses its profile for the proxy account number 4, identifies the actual stored value account number and returns the actual account number to CAS 20 (STEP 110) for authorization. CAS 20 then recognizes the stored value account and forwards the request to the stored value account system 14 for authorization (STEP 112). The stored value system 14 applies its standard rules and conditions and returns an authorization response to CAS 20 for return to the requesting merchant 50 (STEP 114). The merchant 50 then completes the transaction with the customer 1.

If the payment was authorized, the merchant 50 will use its existing infrastructure (e.g., settlement system 36) to submit the transaction to FINCAP 22 at host 10 for settlement (STEP 116), where FINCAP 22 communicates with the stored value system 14 to reduce the balance of the stored value account associated with the proxy account number 4 (corresponding to card number 6) (STEP 118). Similarly, FINCAP 22 communicates with the accounts payable system 26 (STEP 120) to ensure that the merchant 50 is paid for the transaction (STEP 22).

It should be appreciated that the card number 6 may be the same as the proxy number 4, which is then associated with other accounts, e.g., stored value account 2 or credit card account 3. Alternatively, card number 6 may directly correspond to the stored value account 2 or credit card account 3, in which case the proxy account, e.g., STN 16 system, may not be needed.

Figure 3:
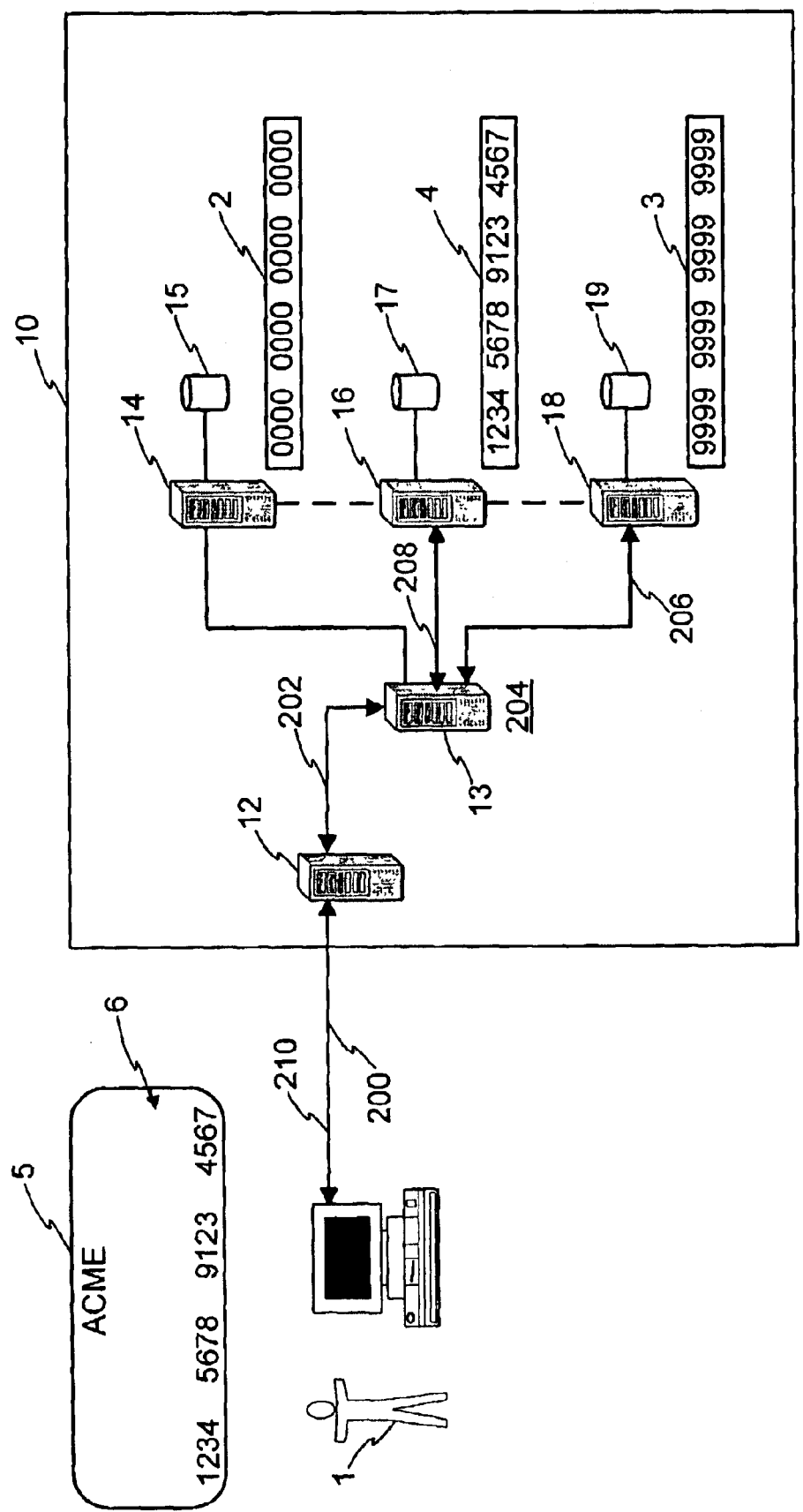
FIG. 3 is a schematic illustrating the processes involved in converting the stored value card to a credit card.

An exemplary online system and method for establishing a credit card account and converting a stored value card to a credit card is now described. In an exemplary embodiment of the present invention, as illustrated in FIG. 3, a customer 1 desiring to convert an existing stored value card to a credit card communicates with host 10 (e.g., host web server 12) via any communication means discussed herein and enters a "convert card registration page," wherein the customer 1 provides the stored value account number to be converted by the system (STEP 200). In the embodiment depicted in FIG. 3, card number 6 corresponds to a proxy account 4 associated with the stored value account 2 maintained in the stored value account database 15. The customer 1 is then directed to an online application page within the host web server 12 where the customer 1 is requested to complete an application form comprising various fields, e.g., name, address, income, etc. After the customer 1 completes the application page, the application information is forwarded to the host 10 new accounts system 13 (STEP 202), wherein the application information is evaluated according to host system 10 rules and processes. Criteria for credit approval may include, inter alia, credit rating, debt/income ratio, etc. If the application is approved, a new account is created and assigned to customer 1 (STEP 204). A database entry and account is created within the credit card database 19 (STEP 206). Although a credit card database 19 and server 18 are shown in FIG. 3, it should be appreciated that an accounts receivable system 24 (see FIG. 1) may be similarly configured. Other host system components (e.g., CAS 20, A/R 24) are updated accordingly. An account conversion instruction set is then sent to the proxy account system, e.g., STN 16, instructing the proxy account 4 to be re-associated from the stored value account 2 to the newly created credit card account 3 (STEP 208). As such, the customer's card number 6 (corresponding to proxy account 4) is thereafter associated with the newly created credit card account 3. After the conversion, the customer 1 is notified that the card 5 may now be used as a credit card for the newly created credit card account (STEP 210). In an exemplary embodiment, the approval and notification process is a substantially real time process occurring over a distributed network, e.g., internet, electronic kiosk, ATM, etc. In other words, the customer 1 may apply for a credit card and convert the stored value card to a credit card in the same online session. For additional information relating to the online or real time acquisition process, please refer to currently pending patent application Ser. No. 10/071,615, entitled *Electronic Acquisition System and Method*, by Stoxen et al., filed on Feb. 5, 2002, the entire contents of which are incorporated herein by reference.

Figure 4:
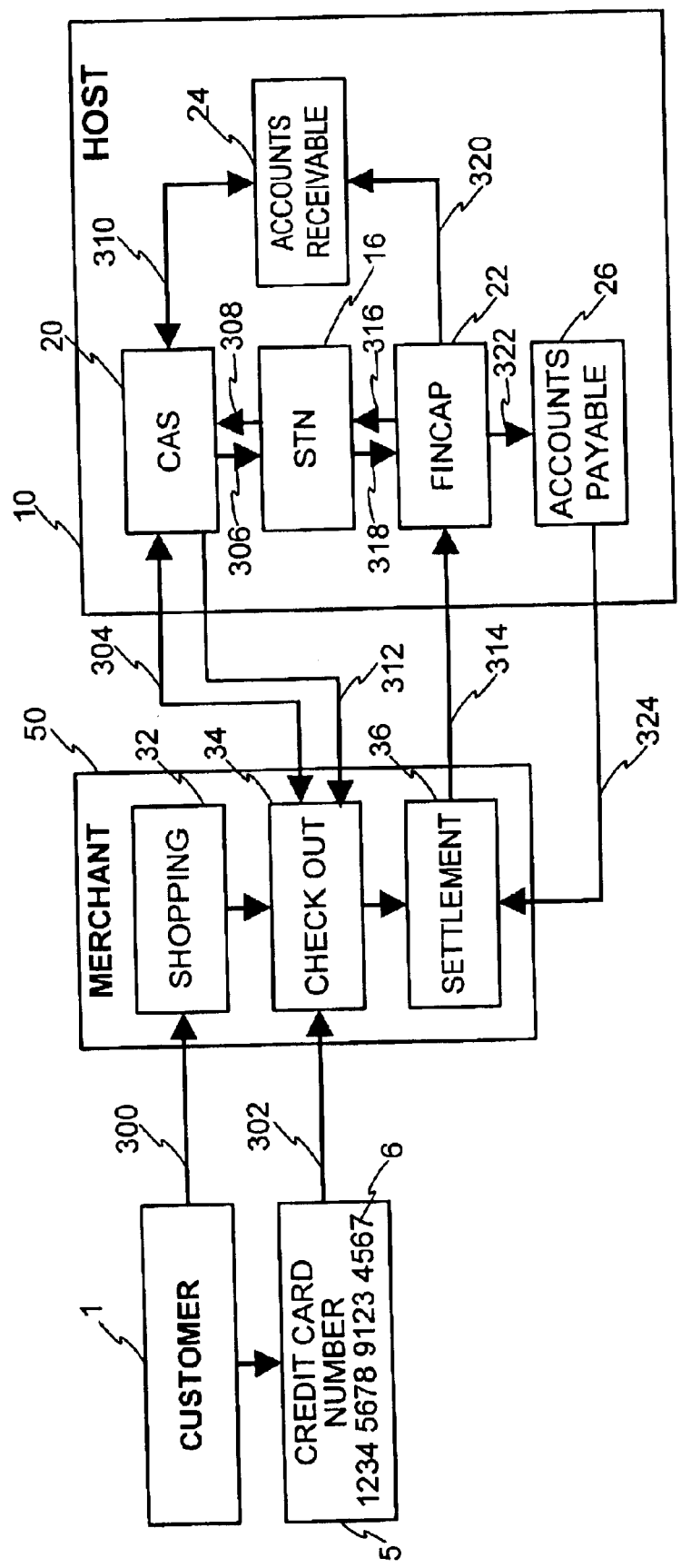
FIG. 4 is a schematic illustrating the process of using a card number as a credit card device after conversion.

FIG. 4 illustrates use of the card number 6 as a second transaction account device (e.g., credit card) that is, after the first transaction account (e.g., stored value account) has been converted to a second transaction account (credit card account). In an exemplary embodiment it should be noted that, except for authorizing the card differently, the flow is similar to that of the stored value card before conversion. Accordingly, as shown in FIG. 4, a customer 1 goes online to an online shopping site 32 at a merchant 50 and selects merchandise for purchase (STEP 300). During checkout 34, the customer 1 indicates that the card number 6 (now associated with credit card account 3) will be used to pay for the purchase (STEP 302). The merchant 50 requests a standard authorization for the account from the host 10 (STEP 304). CAS 20 recognizes the card number 6 as corresponding to a proxy account 4 and forwards the request to the proxy account system, e.g., STN 16 (STEP 306). STN 16 identifies the credit card account corresponding to card number 6, and returns the credit account number 2 (see FIG. 1) to CAS 20 for authorization (STEP 308). CAS 20 communicates with the credit card account system, e.g., accounts receivable 24, to apply authorization rules and conditions (STEP 310). An authorization response is then provided to the merchant 50 (STEP 312). When approved, the merchant 50 submits the transaction receipt and/or summary of charges using its standard submission method to the FINCAP 22 (STEP 314). FINCAP 22 recognizes the card number 6 as corresponding to a proxy number 4 and forwards the transaction to the proxy account system, e.g., STN 16 (STEP 316). STN 16 translates the card number 6 into the associated credit account number 2 and returns this credit account number 2 to FINCAP 22 (STEP 318). FINCAP 22 forwards the transaction to the appropriate credit card system, e.g., accounts receivable 24, for customer statementing and billing (STEP 320). FINCAP 22 then forwards the transaction to the accounts payable system 26 (STEP 322) for merchant 50 payment (STEP 324), thus completing a transaction with a card 5 after it has been converted to a credit card.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical contract optimization or contract compliance system.

We claim:

1. A method for facilitating the re-association of a card number from a first transaction account to a second transaction account, comprising the steps of:

providing said second transaction account;

receiving said card number associated with said first transaction account;

associating said card number with said second transaction account;

wherein said card number is a proxy account number, wherein said proxy account number within a proxy system is configured to associate said proxy account number to more than one transaction account, and wherein said proxy account number is authorized to be used for multiple transactions.

2. The method of claim 1, wherein said card number comprises unchangeable indicia permanently associating said card number with a proxy account number.

3. The method of claim 2, wherein said indicia is a bank identification number (BIN).

4. A method for facilitating the re-association of a card number from a first transaction account to a second transaction account, comprising the steps of:

providing said second transaction account;

receiving said card number associated with said first transaction account;

associating said card number with said second transaction account;

wherein said card number corresponds to a proxy account number, and said proxy account number within a proxy system is configured to associate said proxy account number to one or more transaction accounts;

wherein said card number comprises unchangeable indicia permanently associating said card number with a proxy account;

facilitating, during a customer-merchant transaction, a merchant authorization process after said conversion, wherein said authorization process comprises the steps of:

providing an authorization system;

recognizing said indicia of said card number as the indicia of a proxy account;

forwarding to a proxy account system;

identifying said second transaction account associated with said card number;

determining if said second transaction account is authorized for a transaction; and returning authorization result to said merchant;

facilitating a merchant settlement process after said conversion, wherein said settlement process comprises the steps of:

receiving a settlement request from said merchant;
recognizing said indicia of said card number is the indicia of said proxy account;
forwarding to said proxy account system;
recognizing said proxy account as associated with said second transaction account;
charging amount of transaction against said second transaction account; and
adjusting said second transaction account balance by amount of said transaction.

5. The method of claim 4, wherein said second transaction account is a credit card account.

6. A method of re-associating an existing stored value account number, that is associated with a stored value account, to a new account, comprising the steps of:
providing a conversion interface;
receiving a conversion request from a customer;
presenting to said customer an account application form, wherein said customer is prompted to provide said existing stored value account number;
communicating a completed account application to a new accounts system;
determining if said customer qualifies for a new account;
issuing said new account to said customer; and
associating said new account with said existing stored value account number, wherein said existing stored value account number is authorized for multiple purchases, and wherein said associating step further comprises the steps of:
forwarding said existing stored value account number to a proxy account system; and
using said proxy account system to recognize said existing stored value account number account as associated with said new account.

7. The method of claim 6, further comprising the steps of closing said stored value account.

8. The method of claim 6, wherein said conversion interface facilitates online communication between said customer and said host.

9. The method of claim 8, said step for providing an online conversion interface further comprising the steps of:
providing a registration web page; and
prompting said customer to complete an online application form.

10. The method of claim 6, further comprising the steps of:
determining if said stored value account has an outstanding value at the time of the conversion request;
removing, if said stored value account has an outstanding value, said value from said stored value account; and
crediting said value to said new account.

11. The method of claim 6, further comprising the step of updating authorization systems and accounts receivable systems to reflect said new account information.

12. A system for converting a first transaction account to a second transaction account comprising:
a user interface system configured to communicate with said user to accept a request from said user to convert a card number associated with said first transaction account to a card number associated with a second transaction account;
a new accounts system configured to generate a second transaction account;
a modifiable computer data structure configured to associate a card number with a plurality of transaction account types; and
a proxy account system configured to facilitate the re-association of said card number from said first transaction account to said second transaction account.

13. The system of claim 12, wherein said first transaction account is a stored value account and said second transaction account is a credit card account, wherein said card number is the account number of said stored value account, and wherein said card number is a proxy number for said credit card account.

14. A method for facilitating the re-association of a transaction instrument number from a first transaction account to a second transaction account, comprising the steps of:
issuing a transaction instrument, wherein said transaction instrument is associated with a first number, wherein said first number is a proxy account number, and wherein said proxy account number is associated with the first transaction account;
providing the second transaction account;
receiving said proxy account number associated with the first transaction account;
disassociating said proxy account number from the first transaction account; and
associating said proxy account number with the second transaction account.

15. A method for issuing transaction accounts comprising the steps of:
issuing a first transaction account number, wherein said first transaction account number is associated with a proxy number;
providing a second transaction account;
receiving said first transaction account number associated with said first transaction account, wherein said first transaction account number is usable in successive transactions;
using said proxy number to associate, during authorization and settlement phases, said first transaction account number with said second transaction account number.

16. A method for issuing a credit card transaction account comprising the steps of:
issuing a stored value transaction card, wherein said stored value transaction card is a physical object having a first transaction account number associated therewith, wherein said first transaction account number is associated with a proxy number, and wherein said proxy number is associated with a stored value transaction account;
providing a credit card transaction account having a second transaction account number different from said first transaction account number;
changing said proxy number association from said stored value transaction account to said credit card transaction account;
receiving said first transaction account number; and
using said proxy number to associate said first transaction account number with said second transaction account number.

17. The method of claim 16, wherein using said proxy number further comprises forwarding said first transaction account number to a proxy account system and forwarding said second account number from said proxy account system to a credit card account system.

18. The method of claim 15, wherein said first transaction account number is permanently associated with a first transaction instrument comprising a physical device configured for facilitating financial transactions.

* * * * *